(12) United States Patent
Lugg

(10) Patent No.: US 10,232,937 B2
(45) Date of Patent: Mar. 19, 2019

(54) HYPERSONIC AIRCRAFT

(71) Applicant: Richard H. Lugg, Yarmouth, ME (US)

(72) Inventor: Richard H. Lugg, Yarmouth, ME (US)

(73) Assignee: Hypermach Aerospace Industries, Inc., Portland, ME (US)

( * ) Notice: Subject to any disclaimer, the term of this patent is extended or adjusted under 35 U.S.C. 154(b) by 0 days.

(21) Appl. No.: 14/099,393

(22) Filed: Dec. 6, 2013

(65) Prior Publication Data

US 2015/0108269 A1    Apr. 23, 2015

Related U.S. Application Data

(60) Provisional application No. 61/734,747, filed on Dec. 7, 2012, provisional application No. 61/754,771, filed on Jan. 21, 2013.

(51) Int. Cl.
| | | |
|---|---|---|
| *B64C 30/00* | (2006.01) | |
| *B64D 29/04* | (2006.01) | |
| *B64C 1/26* | (2006.01) | |

(52) U.S. Cl.
CPC ............. *B64C 30/00* (2013.01); *B64C 1/26* (2013.01); *B64D 29/04* (2013.01)

(58) Field of Classification Search
CPC ............ B64C 30/00; B64C 1/26; B64D 29/04
USPC ........................................ 244/1 N, 130, 205
See application file for complete search history.

(56) References Cited

U.S. PATENT DOCUMENTS

| | | | | |
|---|---|---|---|---|
| 3,053,484 A | * | 9/1962 | Alford, Jr. et al. | ............ 244/218 |
| D202,311 S | * | 9/1965 | Rellis | ............... 244/87 |
| 3,237,892 A | * | 3/1966 | Smithurst et al. | ........... 244/73 R |
| 3,279,725 A | * | 10/1966 | Andrew | ................ B64C 13/16 244/191 |
| D213,528 S | * | 3/1969 | Rellis | ........................... D12/332 |
| 3,447,761 A | * | 6/1969 | Wadleigh | .................. B64C 3/40 244/102 R |
| 3,478,989 A | * | 11/1969 | Bielefeldt | ................. B64C 5/12 244/120 |
| 3,647,160 A | * | 3/1972 | Alperin | ................... G10K 11/16 244/1 N |
| 3,655,147 A | * | 4/1972 | Preuss | ..................... B64C 23/04 244/1 N |
| 3,709,446 A | * | 1/1973 | Espy | ....................... B64C 23/04 244/1 N |
| 3,737,119 A | * | 6/1973 | Cheng | ..................... B64C 23/04 244/1 N |

(Continued)

*Primary Examiner* — Assres H Woldemaryam
(74) *Attorney, Agent, or Firm* — Maine Cernota & Rardin

(57) ABSTRACT

A supersonic aircraft having unique structural, geometrical, electromagnetic, mechanical, thermal and aerodynamic configuration is described. Its design characteristics maximize aerodynamic performance, speed, efficiency, comfort and range in the operational affect of carrying passengers over long distances at very high flight speeds and Mach numbers, generally above Mach 4.0+. It has fully integrated-mated fuselage twin engine nacelle structures which reduce and stabilize wave drag, wherein engines sit forward of the sonic boom electrode swept aerospace but are integrated right through the sub-wing, the aero-spike and inlet just above the top surface of the central wing, and above and the major wing mating join, attached via a massive composite titanium keel structure, through the central wing box and fuselage.

6 Claims, 3 Drawing Sheets

(56) References Cited

U.S. PATENT DOCUMENTS

| | | | |
|---|---|---|---|
| 3,776,489 A * | 12/1973 | Wen | B64C 23/04 244/1 N |
| 4,114,836 A * | 9/1978 | Graham | B64C 23/00 181/296 |
| 4,483,497 A * | 11/1984 | Rethorst | B64C 30/00 244/1 N |
| 4,598,886 A * | 7/1986 | Friebel | B64C 23/04 244/15 |
| 4,650,139 A * | 3/1987 | Taylor et al. | 244/172.4 |
| 4,691,879 A * | 9/1987 | Greene | B64C 39/08 244/13 |
| 4,828,204 A * | 5/1989 | Friebel | B64C 1/0009 244/117 R |
| 5,082,206 A * | 1/1992 | Kutschenreuter et al. | 244/53 B |
| 5,251,846 A * | 10/1993 | Rethorst | B64C 3/14 244/1 N |
| 5,322,242 A * | 6/1994 | Tracy | B64C 3/14 244/204 |
| 5,348,256 A * | 9/1994 | Parikh | B64C 21/06 244/204 |
| 5,358,156 A * | 10/1994 | Rethorst | B64C 3/14 244/15 |
| 5,538,201 A * | 7/1996 | Gerhardt | B64C 3/10 244/204 |
| 5,676,333 A * | 10/1997 | Rethorst | B64C 3/14 244/130 |
| 5,740,984 A * | 4/1998 | Morgenstern | B64C 30/00 244/1 N |
| 5,797,563 A * | 8/1998 | Blackburn et al. | 244/130 |
| 5,842,666 A * | 12/1998 | Gerhardt | B64C 3/10 244/15 |
| 5,897,076 A * | 4/1999 | Tracy | B64C 3/14 244/117 A |
| D417,184 S * | 11/1999 | Hartmann | D12/319 |
| 6,070,831 A * | 6/2000 | Vassiliev | B64C 1/00 244/117 R |
| D428,381 S * | 7/2000 | Hartmann | D12/332 |
| D471,854 S * | 3/2003 | Rouleau | D12/319 |
| 6,527,221 B1 * | 3/2003 | Kremeyer | 244/1 N |
| 6,570,333 B1 * | 5/2003 | Miller et al. | 315/111.21 |
| D477,561 S * | 7/2003 | Nelson | D12/319 |
| 6,698,684 B1 * | 3/2004 | Henne | B64C 23/04 181/211 |
| 6,805,325 B1 * | 10/2004 | Malmuth et al. | 244/205 |
| 6,854,687 B1 * | 2/2005 | Morgenstern | B64C 1/0009 244/1 N |
| 6,857,599 B2 * | 2/2005 | Tracy | B64C 3/10 244/45 A |
| 6,921,045 B2 * | 7/2005 | Chang | B64C 3/16 244/15 |
| 6,923,403 B1 * | 8/2005 | Dizdarevic | B64C 1/0009 244/117 R |
| 6,959,896 B2 * | 11/2005 | Hartmann et al. | 244/35 A |
| 7,063,288 B1 * | 6/2006 | Kremeyer | 244/1 R |
| 7,121,511 B2 * | 10/2006 | Kremeyer | 244/130 |
| 7,162,859 B2 * | 1/2007 | Franchet | F02K 3/025 60/204 |
| 7,309,046 B2 * | 12/2007 | Makino | B64C 30/00 244/130 |
| 7,641,153 B2 * | 1/2010 | Smereczniak | 244/205 |
| 7,648,100 B2 * | 1/2010 | Kremeyer | 244/1 R |
| 7,726,609 B2 * | 6/2010 | Shmilovich | B64C 9/38 244/204 |
| 7,744,039 B2 * | 6/2010 | Miles et al. | 244/205 |
| 7,793,884 B2 * | 9/2010 | Dizdarevic | B64C 1/0009 244/117 R |
| 7,854,409 B2 * | 12/2010 | Dizdarevic | B64C 1/0009 244/117 R |
| 8,074,924 B2 * | 12/2011 | Cros | B64C 5/06 244/13 |
| 8,083,171 B2 * | 12/2011 | Henne | B64C 30/00 244/1 N |
| 8,191,820 B1 * | 6/2012 | Westra et al. | 244/36 |
| 8,292,220 B1 * | 10/2012 | Westra et al. | 244/118.1 |
| 8,453,961 B2 * | 6/2013 | Lugg | 244/13 |
| 2002/0096598 A1 * | 7/2002 | Nelson | B64C 1/0009 244/15 |
| 2004/0065774 A1 * | 4/2004 | Hartmann et al. | 244/36 |
| 2004/0245380 A9 * | 12/2004 | Hartmann et al. | 244/36 |
| 2005/0061908 A1 * | 3/2005 | Kremeyer | 244/1 N |
| 2005/0178900 A1 * | 8/2005 | Quayle | B64C 25/14 244/102 R |
| 2005/0224630 A1 * | 10/2005 | Henne et al. | 244/1 N |
| 2005/0230529 A1 * | 10/2005 | Towne | 244/35 R |
| 2005/0274844 A1 * | 12/2005 | Stuhr | 244/46 |
| 2007/0040726 A1 * | 2/2007 | Kremeyer | 342/52 |
| 2007/0114322 A1 * | 5/2007 | Smereczniak | 244/1 N |
| 2007/0126292 A1 * | 6/2007 | Lugg | 310/11 |
| 2007/0145192 A1 * | 6/2007 | Henne et al. | 244/139 |
| 2007/0176046 A1 * | 8/2007 | Kremeyer | 244/1 N |
| 2007/0252028 A1 * | 11/2007 | Morgenstern | 244/1 N |
| 2008/0023589 A1 * | 1/2008 | Miles et al. | 244/205 |
| 2008/0067283 A1 * | 3/2008 | Thomas | 244/1 N |
| 2008/0142641 A1 * | 6/2008 | Moore et al. | 244/215 |
| 2010/0043389 A1 * | 2/2010 | Conners | B64D 33/02 60/204 |
| 2010/0163670 A1 * | 7/2010 | Dizdarevic | B64C 1/0009 244/36 |
| 2010/0224735 A1 * | 9/2010 | Dizdarevic | B64C 1/0009 244/45 A |
| 2011/0095137 A1 * | 4/2011 | Tracy | B64C 3/10 244/35 R |
| 2011/0133021 A1 * | 6/2011 | Lugg | B64C 30/00 244/13 |

\* cited by examiner

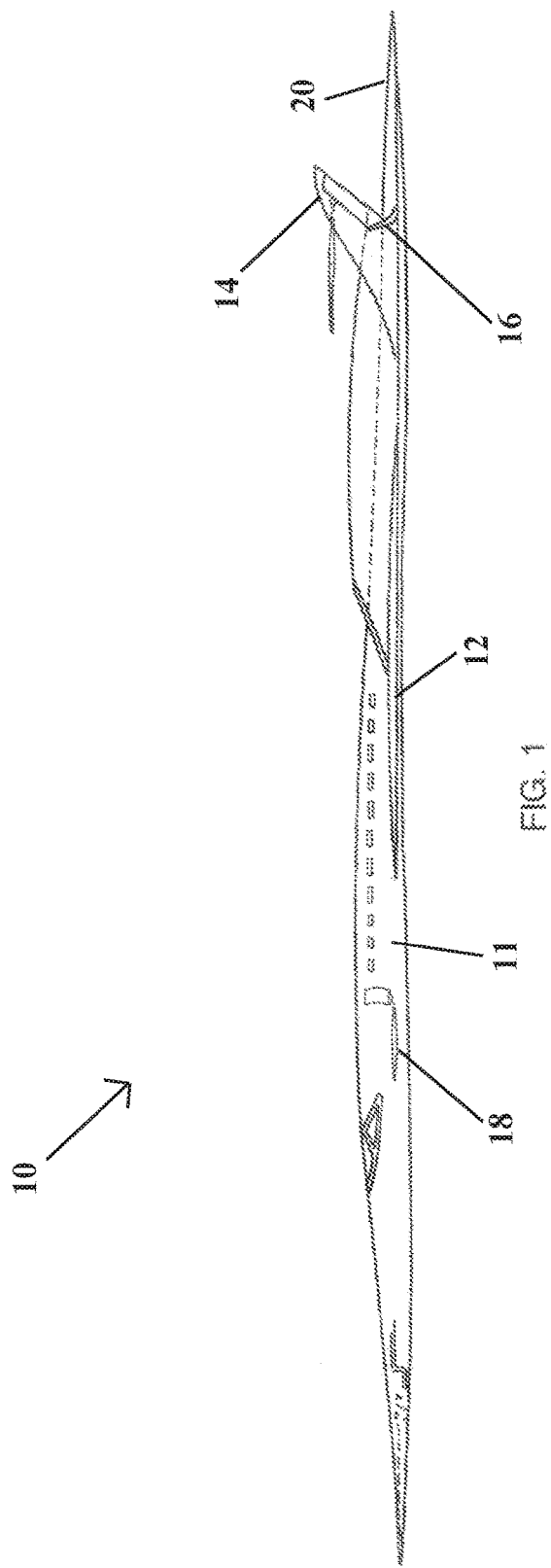

HYPERSONIC AIRCRAFT

BACKGROUND OF THE INVENTION

1. Field of Invention:

The present invention relates to supersonic aircraft. Specifically, it relates to a supersonic aircraft referred to herein as the HyperMach Hypersonic Hybrid Business Jet (HHYBJ), VVIP Class design, SonicStar, and its unique structural, geometrical, electromagnetic, mechanical, thermal and aerodynamic configuration. Its novel design characteristics maximize aerodynamic performance, speed, efficiency, comfort, and range in the operational affect of carrying passengers over long distances at very high flight speeds and Mach numbers, generally above Mach 4.0+.

2. Description of the Prior Art:

For decades, the development of economically and environmentally acceptable supersonic aircraft and hypersonic spacecraft has been identified as a key step toward the next generation of aerospace the and future development of $21^{st}$ Century travel that could improve many aspects of human life and accelerate the fostering of global economic growth. The partial consensus view of prospective manufacturers of supersonic aircraft, not alone a hypersonic hybrid business jet aircraft such as proposed in the invention here of SonicStar, is a near-term-realizable class of aircraft which would have significant economic potential and with an estimated market of at least 200 aircraft over a 15-year period. The key technology barrier for this class of aircraft is the combined utility of very high speed and efficient propulsion engines and the elimination, or reduction to acceptable levels of the sonic boom for flight over land.

Simultaneously it provides a design to meet performance metrics and requirements of the other major disciplines to make an aircraft of this type a reality and economically viable. This essentially means that all major disciplines including aerodynamics, aerotheramodynamics, structures, stability and control, mission, and propulsion systems should be taken into account from the early stages of the design process; and therefore, boom reduction must be considered as a major variable and key enabling technology.

The impact of these design constraints must be handled on the front end of the design process in the conceptual refinement area, and proceeding into detail design with the appropriate multivariate analysis software design tools.

Due to the multivariate design approach required in hypersonic air vehicle and aircraft design, and a business jet design to attain these speeds never having been done before, effective and practical very high speed flight regimes are very difficult to achieve both in a pragmatic sense and in the superlative sense from the position, of passenger safety, performance and certification, and a next generation design to operate on a successful business model in order to commercialize such a design, is such a that in such a type of aircraft. Ultimately to benefit from profitability is the goal when simultaneously refining multiple technical design factors, and reducing technological risks as major contributors to a successful and marketable supersonic business jet design.

Hypervelocity flight requirements are demanding on aircraft with flight missions and design envelopes which exceed Mach 1.0 and doubly difficult when design points for speeds above Mach 2.0 are to be achieved, and are required simultaneously with effective ranges. Above Mach 3.5+ the design challenges become so significant to the standpoint of refinement that the engineering, challenge must be handled as a multivariate problem, and at a Mach 4.0+ design cruise mission the interaction of the new physics challenge (air becomes a plasma flow field interfacing directly with the material world or metal of the aircraft) now the challenge has tripled in complexity and challenge compared to a Mach 2.0 cruise, or Mach 3.0 cruise design scenario, compared to a Mach 4.0+ design scenario.

As speeds rise in aircraft designs to trim flight times over long ranges in consideration of speeds in excess of Mach 3.0+ and service ceilings above 60,000 feet the physical effects on the airframe become problematic from aerothermodynamic heating, subsequently the drag generated, and the heating of the airframe from the air in which the aircraft is passing through. Drag increases in the square of the speed, as speed doubles, drag increases at a three-fold rate, to the cube. Simultaneously, aircraft designed to travel at these speeds generate shock waves from the nose rearward of the aircraft and these shock waves than in trains and coalesce, pro mating to the ground causing sonic booms.

Research and development in aircraft configurations for very high speed flight has been conducted by major international institutes and aircraft companies over the years, but none have addressed the benefits sit flight speeds to be sustained at Mach 4.0 and above in atmospheric conditions (up to 90,000 feet). This is because, until now, there was no air breathing engine design that could maintain these flight speeds and breath, and there was no alternative answer in terms of technology to the issue of sonic boom. Nor was there innovative technology to meet the technical challenges required to be addressed successfully to overcome the challenges of flying at these speeds over a sustained period. It is at this point that the present invention of the HyperMach SonicStar Mach 4.0 HHYBJ aircraft has configuration, aerodynamic and structural attributes and uniqueness in its airframe design which will welcome in a whole new era of high speed commercial transport, setting it apart from any other aircraft yet to be conceived over the next 20-30 years.

BRIEF DESCRIPTION OF THE DRAWINGS

FIG. 1 is a side view of the aircraft of the present invention.

DETAILED DESCRIPTION OF THE INVENTION

Figure 2A:
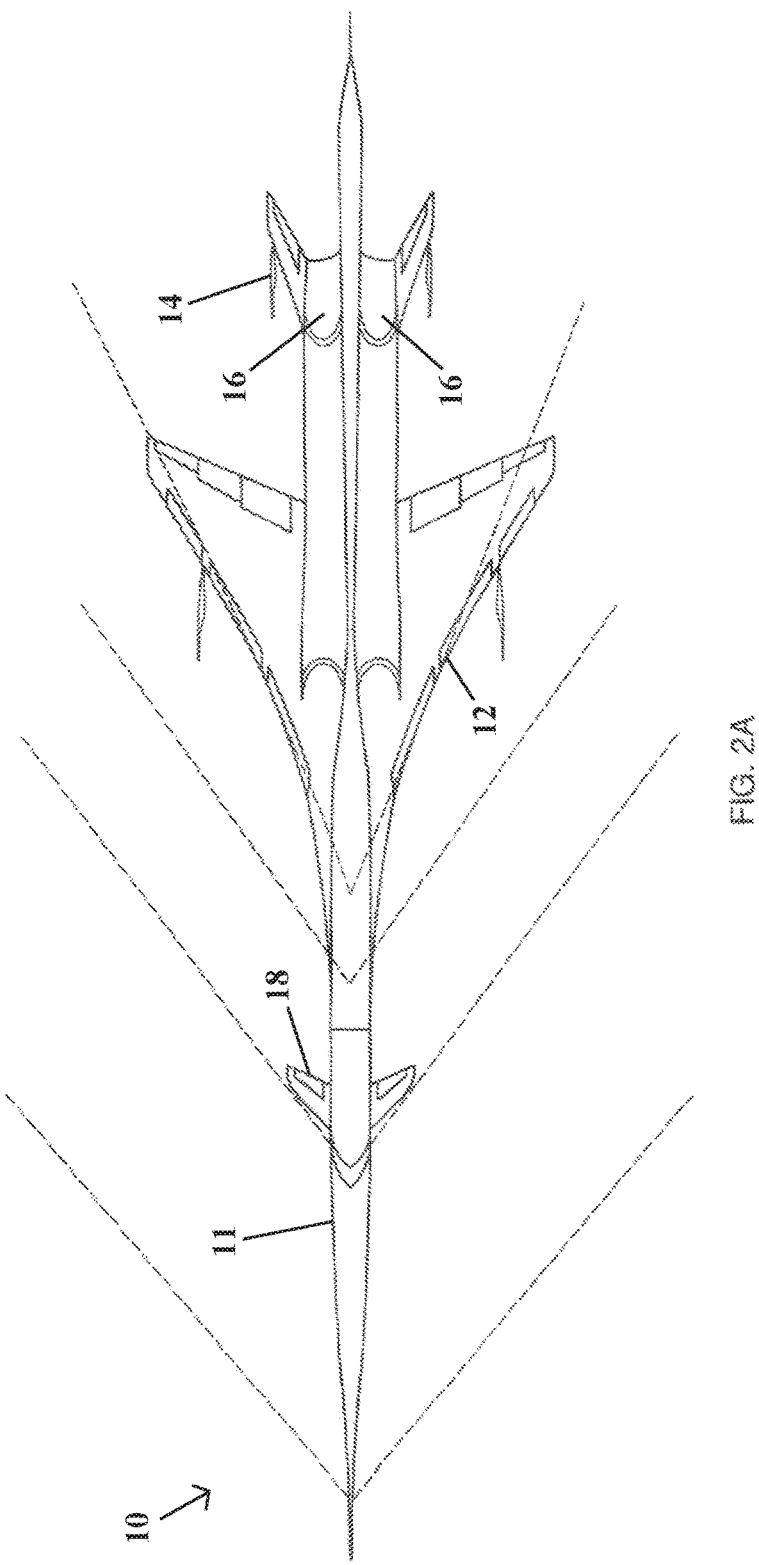
FIG. 2A is a top view of the aircraft of the present invention.
Figure 2C:
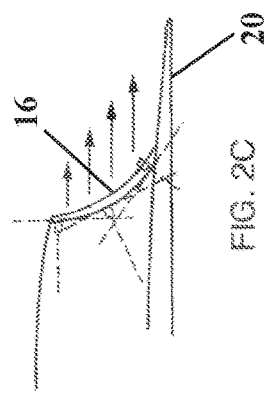
FIG. 2C is a representation of the tangent vectors that attenuate Mach number frequency from exhaust diffuser.
Figure 2B:
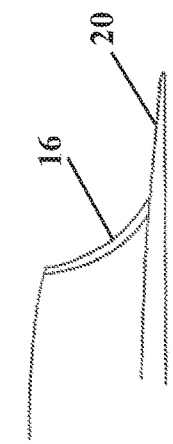
FIG. 2B is a side view of the convex profile of the exhaust diffuser.
Figure 3:
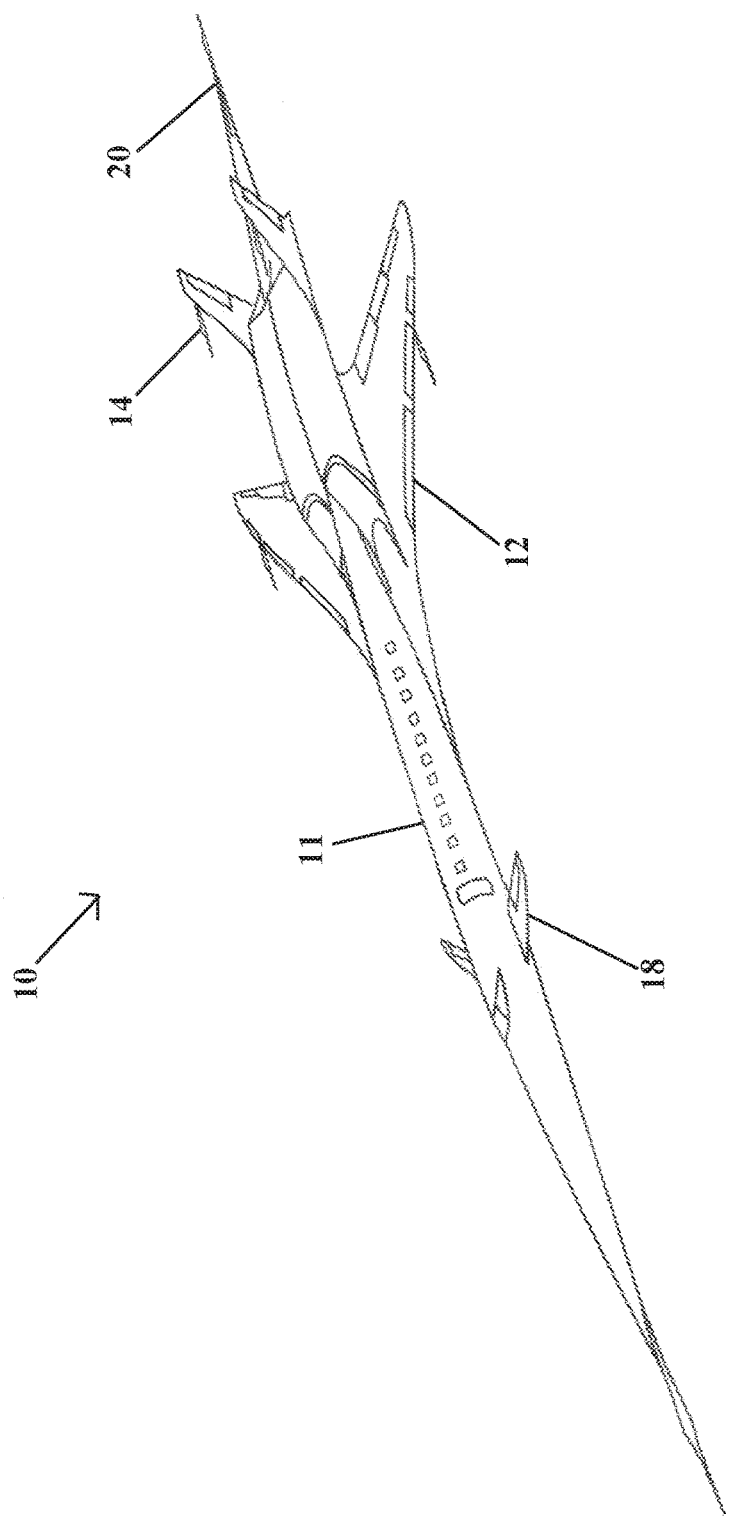
FIG. 3 is a profile, view of the aircraft of the present invention.

The HyperMach, Second Generation, Blended Aerodynamic Aircraft Design has numerous configuration and aerodynamic advantages which make the design propriety in its at of successful operational speeds above Mach 4.0.

1. Overall Aircraft Planform Configuration:
The HyperMach SonicStar Blended Aerodynamic Mach 4.0 Design Configuration is:
 a monoplane hypersonic hybrid business jet (HHYBJ) 10 VVIP luxury class aircraft whose whole planform, aerodynamics, structure and propulsion systems and design accents speak to a design high Mach cruise number of 4.4+, and a long range number to 6000 NM with the unique features of:
 a.) 77 degree highly swept parabolic supersonic wing planform 12 extending from a fuselage 11 with a Mach cone angle behind the propagating defined Mach line, and that is which specific to aerodynamic lift coefficients of in lift to drag of between 12-14 for lifting flight efficiency above Mach 4.0.

b.) a center of the wing mass (WM) which resides at approximately 48% of the Mean Aerodynamic Chord of the outer highly swept wing and which resides at 31% approximately of the inboard supersonic subwing delta structure adjacent to the fuselage, and outer wing, which is continuous as a parabolic leading edge.

c.) mean aerodynamic chord (MAC) is located behind the center of gravity of the entire aircraft.

d.) the overall majority (70%) wetted surface area (WSA) of the wing, substructure wing adjacent to the fuselage is located behind the center of gravity of the entire aircraft e.) the highly swept wing is such in its geometric planform for sustained flight, at or above Mach 4.0, that the root chord to tip chord ratios resides between 4.0 and 6.0:1 (i.e very, very thin wing), this is unique and novel for a unit metric which exceeds 6.0. This has always thought to be impossible but needed to reduce swept area drag and wave drag, at the high Mach numbers of the SonicStar design, and not been done before or in a pragmatic sense, or has it ever been achieved in flight surface design in practical aircraft vehicles.

f.) a novel geometry and planform of the V-tail, or butterfly tail 14 aft of the main wing, with more than 90% of its surface area behind the aft engine exhaust nozzles 16, and the angle of the V, such that it is set to maximize the reduction of over runway airframe/engine propagation noise, also described as airframe acoustic integration noise. The V-tail outer wing chord root thicknesses is set at the same centerline as the main wing.

g.) the V-tail is so configured that it is not just a yaw control, stabilizing surface, and elevator lifting device, but in that it also serves as a noise cancellation device while the aircraft is operating during taxi and take-off, and as a lifting body surface of the aircraft (to combine for lifting with the forward canard and the main wing, a in titling surface is formed), and provides the basis of which that the main wing WM, MAC and WSA can be behind the center of gravity of the entire aircraft and that the root chord to tip chord can be above 3.0, but below 4.0 h.) the configuration by mass weight, center of mass and wetted surface area of the aircraft provides a method by which the trim condition of the aircraft at Mach 4.0+ and 62,000 feet (mass air density parameters incorporated) is minimized to zero-zero, and induced wave drag is eliminated i.) whereby a forward canard 18 which aerodynamically provides forward lift to the aircraft to get off certified and regulated runway lengths and be able to slow down on approach and landing below 200 Ktas (current approach speed of SonicStar in present configuration is 220 Ktas, and thereby spreading the drag load, and spoiling of the aerodynamics of the aircraft but optimizing lift, for take-off and landing.

j.) the highly swept wing and butterfly or V-tail surface is size specific surface area defined to maximize cruise efficiency at the design seed of Mach 4.0+ at 62,000 feet service ceiling. Cruise efficiency is described as the ratio of lift to drag whereby lift is maximized in the design and drag is minimized. Typically lift to drag ratios are seen in the range of 7:1, whereas in HyperMach design lift to drag ratio is in the range of 12:1 to 14:1 k.) High lift to drag is possible because the V-Tail has a higher proportion of lining surface capability than any other design conceived prior, is done so with strong reason so that the wing area and its root to chord ratios, and its root to tip chord thicknesses can be small and thin, hence reducing the sonic boom impact and leading edge shock generation to the ground. This is so as the lifting load (aerodynamic lift) is almost equidistant spread between the V-tail and the Main monoplane wing.

l.) This is possible because at design cruise the wing holds an estimate for roughly 64% of the coefficient of lift which is then shared at 21% with the V-tail to the rear and 15% with the front canard. This is configured successfully by the V-tail having a chord to tip ratio of below 4:1, and that this ratio is one root chord to tip chord ratio below to other traditional supersonic designs because of its low drag coefficient m.) The highly swept wing is so configured geometrically that the leading edge is set at a mean average of 72 degrees aft sweep with trailing edge sweep set at 49 degrees sweep. The leading edge sweep varies from 78 degrees at the root to 66 degrees at the outer wing join (approximately two-thirds out in distance from the root toward the tip of the wing). The angle of sweep is set by achieving a tilling pressure at the design max Mach cruise of 4.4, and at the design altitude of 62,000 ft, which compensates and overcomes the weight of the aircraft fully loaded at this cruise condition (the lifting pressure from the airfoil must exceed the negative weight of the aircraft at any given point in time).

n.) The sweep angle of the wing is set so that the Mach cone which is formed by the nose or the aircraft penetrating the air at any given design cruise condition (i.e. the first shock wave), the Mach cone angle forms ahead of the leading edge of the wing. This is necessary so that a second shock cone or Mach angle (which increases drag) does not occur at the leading edge of the wing as well, therefore physically lowering the sonic boom. Hence, the Mach cone angle formed at the nose creates the same aerodynamic condition (skin friction and wave drag) as is formed at the wing, and at the V-tail, therefore the need that it must sustain some of the lifting mass requirements, sharing the load with the main wing is preserved.

o.) Additionally, the average sweep angle of the wing which is delineated by the leading edge, is noted to have a continuous curvature and is not straight, defined as parabolic. This is novel and unique in a first ever hypersonic business jet (Mach 4.0) design, it is termed parabolic. The curvature is to prevent constant build up of pressure and shock waves at Mach 4.0, shed aerothermodynamic heating by creating transverse cross flow of laminar air down the leading edge to add to leading edge cooling, and above from the oncoming freestream air behind the shock cone. Subsequently the curved leading edge of the highly swept wing prevents undue pressure build up and reduces heat load simultaneously. Undue pressure buildup can contribute, to the decay of the lift to drag coefficients required for the design cruise condition and the fuel burn constraints needed to achieve the specific range requirements of the HyperMach SonicStar aircraft.

p.) The parabolic leading edge of the highly swept wing of SonicStar addresses the natural tangential angle of the shock cone to the wing, and always maintains the Mach angle perpendicular to the wing, reducing tangential offset, this is a unique and innovative geometrical and aerodynamic phenomena of the SonicStar wing design. No matter what the Mach number, the trajectory of the airflow, drag and lift remains more consistent through the high Mach number regimes (above Mach 3.0+) than that of a straight leading edge wing.

2. Numerical Design and Analysis of the HyperMach Wing Aerodynamics 2. a.) The curved, highly swept leading edge of the wing also serves the purpose of supporting aerodynamic stability in low-speed high alpha flight, approach and landing speed conditions (high-alpha is high, nose-high flight conditions, approaching stall), as well as being optimized for high mach number flight (above Mach 3.0), but carries little washout condition distal to the wing join, therefore to induce laminar now near stall, reduce drag, and promote a high lift condition (high lift to drag ratios) at design Mach cruise conditions (Mach 4.0+) Beyond the outer wing join, although the curvature is continuous (parabolic) and described by a single algorithmic equation and bounded numerically by partial differential equations denoting airfoil shaping, and based on the functions of lift as in; velocity, is density, reference wing area, viscosity and the speed or sound such that lift=L where;

$$L = f(V_\infty, \rho, S, \mu, a_\infty)$$

2. b.) Another relationship exists for both the drag (D) and pitching moment (M) with these quantities further defined by the transition of the outer parabolic wing aerodynamics and the inner wing/nacelle engine support structure aerodynamics adjacent to the fuselage as these lifting surfaces function for low speed and approaching stall flight. A hybrid aerodynamic condition exists for these two wings (parabolic outer, rectangular engine/nacelle lifting structure adjacent to fuselage) where the performance and numerical analysis of the inner wing panel and geometric aerodynamics there perform in a low speed environment for a highly swept delta, and the aerodynamic condition of the outer parabolic delta functions in a higher speed airflow speed environment. This is best expressed with the parameter $a_\square/V_\square$ which is the inverse of the Mach number, $M_\square$. Here, as it relates to the invention of the HyperMach SonicStar aircraft Mach 4.0 configuration the third quantity defining the hybrid wing environment is the Reynolds number (the outer parabolic delta and the inner rectangular engine/nacelle lifting body) functioning through what is a single wing lifting surface.

$$Re = \frac{\rho V_\infty l}{\mu}$$

And this Reynolds number numeric maybe further expressed in a simplified equation to the form of $$L \propto (\rho V_\infty^2) \left(\frac{1}{M_\infty}\right)\left(\frac{1}{Re}\right)_{/Re-M2/\rho V2-V1}$$

Where it is now defined as a variable hybrid lift coefficient equating the lift and Reynolds number between the low speed flight condition between the outer wing delta and the inner wing delta of HyperMach SonicStar Hypersonic Hybrid Business Jet (HHYBJ) design. A low Mach number model for the hybrid inner and outer wing deltas is more comprehensively derived from compressible flow equations based on asymptotic analysis in an algorithm expression for the Mach number |U|/c, where U is the fluid velocity and c is the speed of sound. This analysis leads to a decomposition of the pressure, p(x, t)=p0(t)+_(x,t), where _/p0=O(M2), and the dynamic pressure, which is decoupled from the equation, of state for the thermodynamic pressure (thermodynamic pressure becomes a critical variable above Mach 2.0), p0=p (O, T, Yk). In this limit, the algorithmic equations that are derived express mass, momentum and energy conservation simultaneously in a hybrid numeric environment which follows in practice the practical application of the highly swept, double delta, carved leading edge of the SonicStar wing, made up of the outer parabola and the inner lifting rectangular sub-wing with engine/nacelle integration as follows:

$$U = t/p)0$$

$$T = p0 - U2 + r \cdot UU + (r - 2r \cdot F + Yk)$$

$$Yk = t + r \cdot \_UYkr = \_Y \cdot Uk + r \cdot Dk.$$

$$H/U - Kr - t' = Kd/r - Yt$$

$$t + r \cdot (\_Uh) - dp0/dt = 2r \cdot q.$$

Here D, U and h are the density, velocity and enthalpy, respectively, and Yk is the mass fraction of species k, Dk, and q are the diffusive fluxes of species, momentum and energy and F represents an external mass flow of forces of a specific dynamic amplitude for any given point along the hybid parabolic leading edge and sweep of the outer wing and the abutment to the inboard recungular sub-wing nacelle/engine integrated structure.

It is known that shock waves and low Reynolds numbers effects distinct in boundary layer separation, and subsonic flow, approach stall as acoustic waves of specific frequency. Thus, there is a need to resolve them numerically, and it is in the above derived algorithmic equation of state which has completely removed the numeric effects of h, Yk and q as the diffusive fluxes of effects on boundary layer conditions at high hypersonic conditions on one end, of the flight spectrum and above on the other, but also bounded on the opposed conditions at the other end of the flight spectrum close to stall, and then at stall; thus the equation of state constrains both divergent flight factors.

At very high Mach numbers such as those to be observed by the HyperMach HHYBJ invention, and the hybrid wing and its aerodynamic condition, the same algorithm evolutionizes through basic discretization, combining a symmetric operator-split treatment of air molecule chemistry and transport as defined by a superheated condition where the air approaches an electromagnetic charged plasma condition, in and of itself, due to high temperatures of skin friction in excess of 600 degrees Fahrenheit at the leading edges of the wing, canard and nose, where to constrain values of density, D and enthalpy h, the derivative of the muss fraction Yk is imposed over time to the degrading value of the superheated air molecules as they adhere and cause the skin friction at temperature upon the wing. To offset this value and reduce skin temperatures as the electromagnetic drag reduction technology provides impedance and changes the kinetic charge of the air mass as it approaches gaseous state in the form of:

$$Dv/Dt(Yk)-h\{(p0(t)+\_(x,t)\}$$

And thus the algorithmic expression is re-defined in terms of velocity and density constrained by enthalpy and degradation of the laminar flow over time, t, due to super-heating and Mach number, M, from aerothermodynamic heating and friction, thus;

$$@\_U$$

$$@t+r\cdot\_UU+Yk\ r\_=\{(Yk)-h\{(p9(t)+(x,t)\}/rt\cdot\_+\_F,$$

Where $p0(t)+\_(x, t)$ is the decompensation of the pressure over time t, and the effects of enthalpy applied to the mass fraction define the degradation of state of laminar flow for a particular laminar condition in the transition of mass air flow with EDRT on and EDRT off, hence the physical and mechanical limits of the aerodynamic effects of the hybrid wing are defined with a density-weighted approximate projection method to impose the evolution constraint. The resulting integration proceeds on the time scale of the relatively slow advective transport. Faster diffusion and chemistry processes are treated implicitly in time. This integration scheme is embedded in an adaptive mesh refinement algorithm based on a hierarchical system of rectangular grid patches.

For details of the low Mach number model for sake of discussion as it applies to near stall, or at stall conditions, and the hybrid parabolic delta wing (outer) and nacelle/engine sub-wing (inner) design effects, its numerical implementation and affects on the hybrid double wing delta geometry as a numeric model are best exhibited as an ideal air flow equation of state, with explicit numerical integration of the compressible reacting flow equations as summation techniques to modeling the flows empirically. Thus the integration algorithm solves a multi-stage procedure involving a number of elliptic/parabolic solves for each time step of velocity, mass density, enthalpy and compressible flow equations being analyzed, whether subsonic, supersonic or hypersonic aerodynamic flow conditions being present or not. This attributes to the numerical analysis as real world, real time and the integration algorithm becomes best suited to define the flow condition, over any given time Dt/Dv (T) with the effects impeding of velocity species, mass density, and enthalpy constraining performance estimates of the HyperMach SonicStar hybrid parabolic delta swept wing design in a subsonic condition, above stall, or at a supersonic/hypersonic condition.

One other unique and prominent point of the HyperMach SonicStar aircraft design concerning both the physical and mechanical aerodynamics technology, is the fully integrated nacelle/engine bays and V-tail configuration with the "sonic boom electrode swept aerospike" (SBESA) 20 flowing aft of the engine exhaust but in plane with the center of the wing forward. This configuration reduces aerodynamic pressure from the continuum of the shock cone, and shock waves created at the bow when the EDRT is off, or when on, assimilates laminar flow and reduces wave drag off the tail of the aircraft, the propagating shock waves hence coalesce between the V-tail and stay close to the "sonic boom electrode swept aerospace" (SBESA) reducing overall pressure in this area, hence reduce drag as the aircraft proceeds from breaking the sound barrier at Mach 1.0 on up to max design cruise of Mach 4.4

The rear SBESA contributes to lift aft of the V-Tail, shaping the shock, by its bulbous spear-shape, and essentially forms a pressure differential between the rear of the aircraft and the forward moment of the aircraft, up to the point of intersection of the leading edge of the canard. It is sized so as to bring the SonicStar aircraft up on step with the aft under plane of the rear wing, which forms a point of compression lift and allows the SonicStar to ride the forming shook wave forming from the first under surface bulge of the fuselage to the second undersurface bulge, or sub wing, of the fuselage, off the double delta parabolic wing. This aerodynamic physical morphing of the supersonic lifting flow offers a flight condition of the aircraft where it rides the shock ware supporting compression lift in a "surfing" fashion. As in the aforementioned "surfing" flight phenomena, the capacity of another aerodynamic shaping technology/device below the aircraft, which is unique and novel, features a "double bulge", or a coke-bottle shape in profile at the bottom of the aircraft, which runs from the forward leading edge of the wing to the aft SBESA, which provides the method for the aircraft to hydroplane or "wave ride" the shock wave, forming as a bow wave at the nose of the aircraft, then propagating into an "N" shaped shock wave, of which the second shock occurs below the exact point, mid-wing of the chord, below the aircraft, and the coke-bottle profile shape (double bottom fuselage bulge) is the narrowest, and attenuates the N-Point of this second shock by pressure reduction through expanding the rising compression formed by the shock waves, and the SBESA bringing the fuselage "up on step", or "surfing" with compression lift, on the continuously forming second shock wave below the aircraft, ultimately at Mach ranges between Mach 2.8-4.4.

Another unique aerodynamic shaping feature of the HyperMach aircraft configuration is the fully integrated-mated fuselage twin engine nacelle structures which reduce and stabilize wave drag (a key contributor typically where removing the mounting of the engine nacelles from the rear fuselage, which normally reduces the expanding low to high pressure aerodynamic flow, and that this is a negative design consideration in supersonic and hypersonic flow conditions), subsequently engines sit forward of the SBESA, but are integrated right through the sub-wing, the aero-spike and inlet just above the top surface of the central wing, and above and the major wing mating join, attached via a massive composite titanium keel structure, through the central wing box and fuselage. This composite keel structure is unique and novel in this hypersonic hybrid business jet design, in that it simultaneously joins the wing to the fuselage, and the engines to the fuselage, engines to the V-Tail and wings to the engine, in a single structural component.

These strategic locations of major lift and structural airframe assemblies provide the HyperMach SonicStar with a unique airframe platform in such a way that it is so optimized to reduce sonic boom physically, and in combination with, proprietary aerodynamic shaping and structural morphing technologies within the aircraft structure (coke-bottle fuselage bottom "double bulge" and the SBESA electrode tailplane in additional to the "electromagnetic drag reduction technology" (EDRT) as described in U.S. patent application Ser. No. 12/893,489, entitled SUPERSONIC AIRCRAFT WITH SHOCKWAVE CANCELING AERODYNAMIC CONFIGURATION incorporated herein by reference. These are novel and inventive features unique to the SonicStar "hypersonic hybrid business jet" (HHYBJ).

What is claim is:

1. A hypersonic aircraft comprising: a fuselage; a highly swept parabolic wing planform extending from the fuselage at an angle of 77 degrees, wherein a parabolic leading edge of the wing planform has a mean average of 72 degrees aft sweep, and the parabolic leading edge of the wing planform maintains a Mach cone angle perpendicular to the wing planform; a pair of engine nacelles attached to the fuselage, the pair of engine nacelles containing a. pair of engine exhaust nozzles; a butterfly tail attached to the fuselage aft of the wing planform; a canard attached to the fuselage forward of the wing planform; and a sonic boom electrode swept aerospike aft of the engine exhaust nozzles and in plane with a center of the wing planform.

2. The hypersonic aircraft of claim 1 wherein 70% of a wetted surface of the wing planform is located behind a center of gravity of the aircraft.

3. The hypersonic aircraft of claim 1 wherein the sonic boom electrode swept aerospike is a bulbous spear shape arranged to form a pressure differential between a rear of the aircraft and a forward moment of the aircraft.

4. The hypersonic aircraft of claim 1 wherein the parabolic leading edge of the wing planform has a root and an outer wing join and there is an angle of said parabolic leading edge from the fuselage which varies from 78 degrees at the root to about 66 degrees at the outer wing join.

5. The hypersonic aircraft of claim 1 wherein a shock cone is formed around the hypersonic aircraft and the parabolic leading edge of the wing planform addresses a natural tangential angle of the shock cone.

6. The hypersonic aircraft of claim 1 herein a trailing edge of the supersonic wing plan form has a mean average of 49 degrees aft swept.

* * * * *